US012724993B2

(12) United States Patent
Schüler et al.

(10) Patent No.: US 12,724,993 B2
(45) Date of Patent: Sep. 1, 2026

(54) READING OPTICAL CODES

(71) Applicant: SICK AG, Waldkirch (DE)

(72) Inventors: Pascal Schüler, Waldkirch (DE); Christofer Roser, Waldkirch (DE); Thorsten Falk, Waldkirch (DE); Sascha Burghardt, Waldkirch (DE); Romain Müller, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 19/258,112

(22) Filed: Jul. 2, 2025

(65) Prior Publication Data

US 2026/0010745 A1 Jan. 8, 2026

(30) Foreign Application Priority Data

Jul. 8, 2024 (EP) .................................... 24187000

(51) Int. Cl.
*G06K 7/14* (2006.01)

(52) U.S. Cl.
CPC .................................. *G06K 7/1417* (2013.01)

(58) Field of Classification Search
CPC .................................................... G06K 7/1417
See application file for complete search history.

(56) References Cited

U.S. PATENT DOCUMENTS 10,650,211 B2 5/2020 Olivastri

FOREIGN PATENT DOCUMENTS

| | | | |
|---|---|---|---|
| DE | 10137093 | A1 | 2/2003 |
| DE | 102018109392 | A1 | 10/2019 |
| EP | 3428834 | A1 | 1/2019 |
| EP | 3812953 | A1 | 4/2021 |
| EP | 3916633 | A1 | 12/2021 |
| EP | 4231195 | A1 | 8/2023 |

OTHER PUBLICATIONS

T.-H. Chou, C.-S. Ho and Y.-F. Kuo, "QR code detection using convolutional neural networks," 2015 International Conference on Advanced Robotics and Intelligent Systems (ARIS), Taipei, Taiwan, 2015, pp. 1-5, (Year: 2015).*

Hansen, et al.; "Real-Time Barcode Detection and Classification using Deep Learning", DOI: 10.5220/0006508203210327 In Proceedings of the 9th International Joint Conference on Computational Intelligence (IJCCI 2017), pp. 321-327 ISBN: 978-989-758-274-5.

Zhao, et al.; "Deep Dual Pyramid Network for Barcode Segmentation using Barcode-30k Database", Institute of Computer Science and Technology, Peking University arXiv:1807.11886v1 [cs.CV] Jul. 31, 2018.

(Continued)

*Primary Examiner* — Matthew Mikels

(74) *Attorney, Agent, or Firm* — Nath, Goldberg & Meyer; Jerald L. Meyer; Ilirian Durri

(57) ABSTRACT

A method of reading optical codes is provided comprising the steps of recording an image, locating code zones in the image, and decoding the optical codes in the code zones, wherein the locating of code zones has a first segmentation process with machine learning by which first candidates for code zones are found. In this respect, the first candidates are evaluated to determine parameters for the locating of code zones and/or the decoding of the optical codes.

14 Claims, 5 Drawing Sheets

(56) References Cited

OTHER PUBLICATIONS

Figure 1:
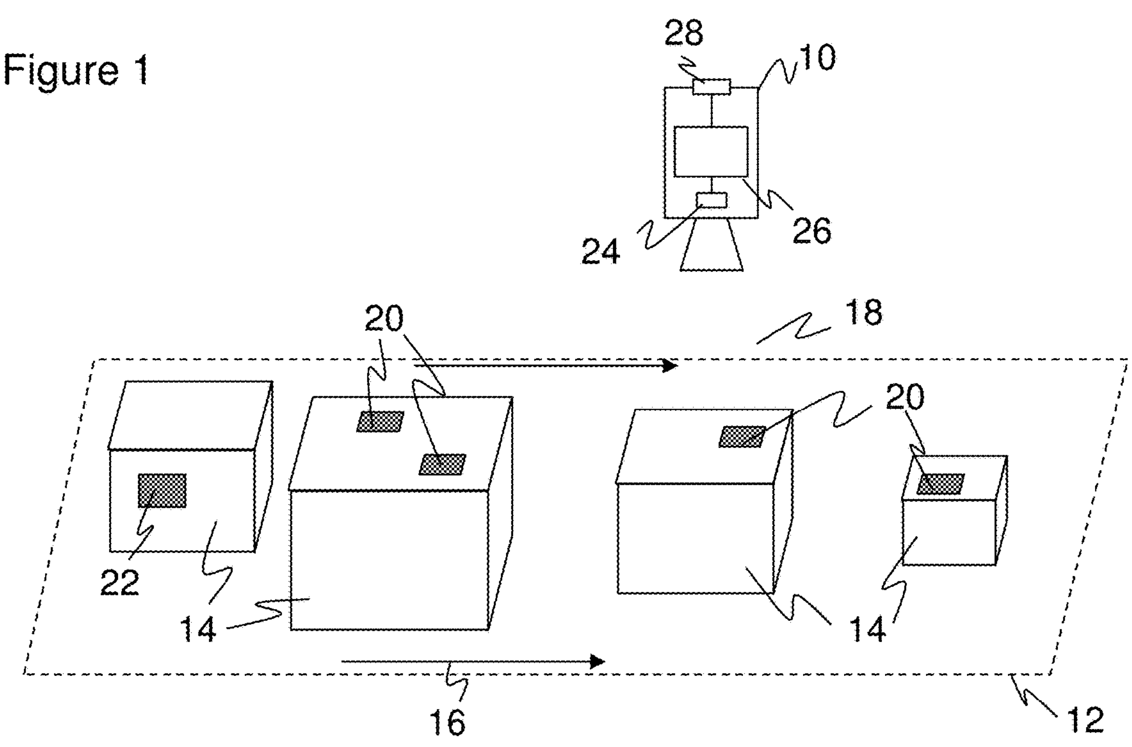

Xiao, et al.; "1D Barcode Detection via Integrated Deep-Learning and Geometric Approach", College of Computer Science, National University of Defense Technology, Changsha 410000, China Received: Jun. 29, 2019; Accepted: Aug. 6, 2019; Published: Aug. 9, 2019.
Zharkov, et al.; "Universal Barcode Detector via Semantic Segmentation", Moscow Institute of Physics and Technology (National Research University) arXiv:1906.06281v2 [cs.CV] Jun. 17, 2019.

* cited by examiner

Figure 3
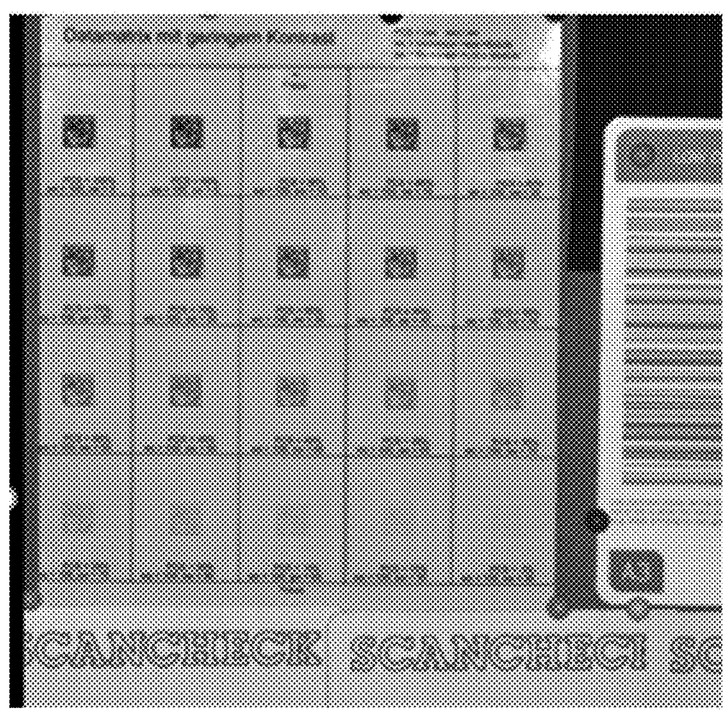
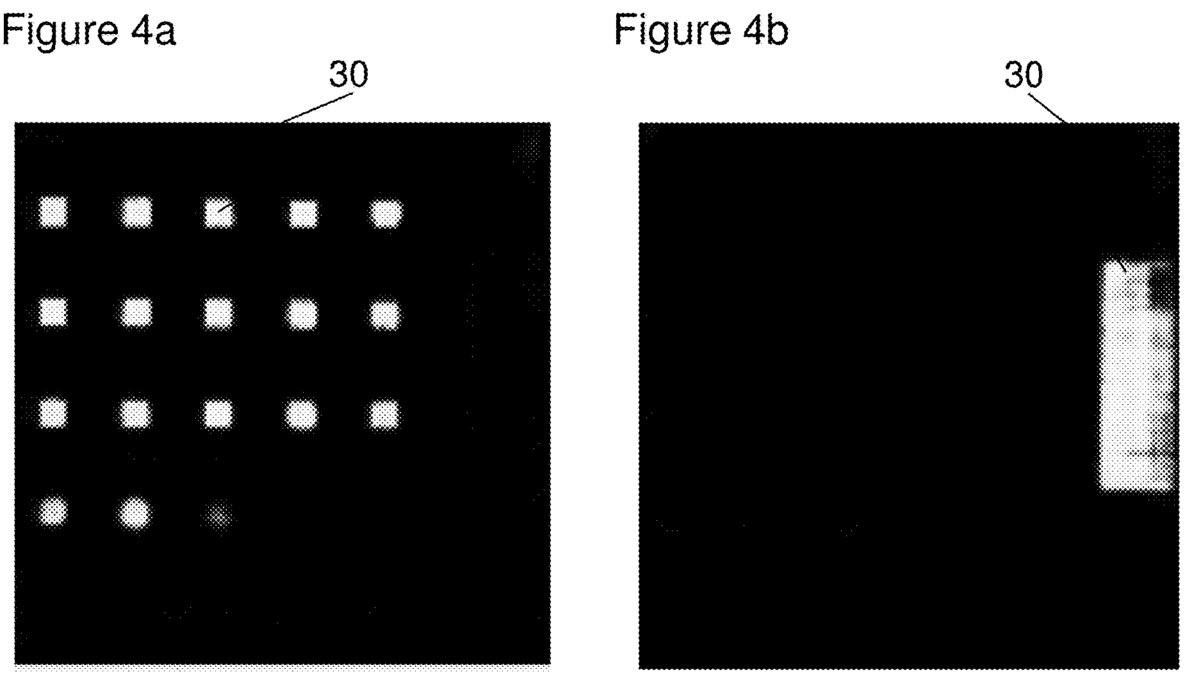
Figure 4a
Figure 4b

READING OPTICAL CODES

The invention relates to a method of reading optical codes and to a corresponding optoelectronic code reader.

Code readers are known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera-based code reader takes images of the objects having the codes located thereon by means of an image sensor and image evaluation software extracts the code information from these images. Camera-based code readers also cope without problem with different code types than one-dimensional barcodes which also have a two-dimensional structure like a matrix code and provide more information.

In an important application group, the code bearing objects are conveyed past the code reader. A code scanner here detects the respective codes successively led into its reading zone. Alternatively, in a camera-based code reader, a line scan camera reads the object images having the code information successively and linewise with the relative movement. As a rule, image data are recorded using a two-dimensional image sensor that overlap more or less depending on the recording frequency and on the conveying speed. So that the objects can be arranged in any desired orientation on the conveyor, a plurality of code readers are often provided at a reading tunnel to record objects from a plurality of sides or from all sides.

Code zones, that is those zones in the image that may potentially contain a code, are sought in a recorded image of a code bearing object as preparation for the reading of codes. This step is called segmentation or presegmentation. In most of today's code reading applications, the segmentation takes place by traditional image processing algorithms and by manually prepared classifiers. Even very small structures are thus often still recognized well and code zones having small codes are thus also found, for example 2D codes with small module and symbol sizes or barcodes having a small code height or bar length. The conventional approach remains very local in its evaluation. In difficult reading situations, for instance with a large number of background structures, a large number of false positive code zones are thereby found, however, that cannot all be processed under the typical real time conditions of the application and that thereby reduce the reading rate. A different approach for the segmentation is based on artificial neural networks, in particular deep neural networks, convolutional neural networks (CNNs). Ultimately such as a neural network applies a plurality of filter kernels trained using example data to the image.

Segmentation and code reading are conventionally fixed at the device side for an application or are manually adapted to an application situation, for example in that processing steps or parameters are set in a graphical user interface. Optimization is thus only possible in the means and the setting of object to object or image to image also remains fixed in a dynamic application. This reduces the reading rate, either directly by codes that have been overlooked or are not readable due to an unsuitable decoding setting or indirectly because the available decoding time is insufficient for the evaluation of all the code zones and images.

The parameter of search contrast can be named as an example that fixes how high the contrast has to be in an image zone so that it can be considered a code zone. If a high search contrast is required, low-contrast code zones can be overlooked, while a low search contrast recognizes a number of code zones that only contained background texture and no optical code at all (false positive). This is found particularly clearly with a code reader in a stationary application at a conveyor belt with a large object height variation. Work has to be carried out with increased contrast sensitivity here, that is with a relatively low search contrast, to still recognize codes applied to flat objects as such that become low contrast due to their rather large distance from the code reader. At the same time, however, codes on larger objects have higher contrasts so that, for example, even a cardboard texture or a pattern located thereon is falsely considered as a code.

It is known from EP 3 812 953 A1 that a code reader determines the distance from a code by means of a distance sensor and sets a parameter or includes an additional algorithm of the decoding process based on the measured distance. However, this requires additional equipment effort for the distance sensor and, additionally, all the parameters important for a segmentation and decoding cannot be derived from the distance.

It is furthermore known to analyze a history of decoding processes statistically with respect to certain characteristics to then adapt parameters for the future code reading. However, this only works with a corresponding history and thus for creeping, constant changes. Abrupt changes or dynamics on short time scales such as a large object height variation can thus not be successfully combatted.

In the paper Zhao, Qijie, et al, "Deep Dual Pyramid Network for Barcode Segmentation using Barcode-30k Database", arXiv preprint arXiv: 1807.11886 (2018), a large data record is synthesized and thus a code segmentation by CNNs is carried out.

Xiao, Yunzhe, and Zhong Ming, "1D Barcode Detection via Integrated Deep-Learning and Geometric Approach", Applied Sciences 9.16 (2019): 3268 claim a performance in the localization of barcodes improved by at least 5% with respect to previous approaches without parameters having to be set manually.

Hansen, Daniel Kold, et al, "Real-Time Barcode Detection and Classification using Deep Learning", IJCCI. 2017 recognize code zones including a rotation in real time using an Intel i5-6600 3.30 GHz and a Nvidia Geforce GTX 1080.

Zharkov, Andrey; Zagaynov, Ivan, Universal Barcode Detector via Semantic Segmentation, arXiv preprint arXiv: 1906.06281, 2019 recognize barcodes and identify the code type in a CPU environment.

DE 101 37 039 A1 discloses a method of recognizing a code and a code reader in which the step of localizing the code within an image environment is carried out by means of a neural network. DE 10 2018 109 392 A1 proposes the use of convolutional neural networks for detecting optical codes. A further code reader is known from U.S. Pat. No. 10,650,211 B2 that uses convolutional neural networks for the locating of the codes in a recorded image.

EP 3 428 834 B1 uses a classical decoder that works with processes without machine learning to train a classifier configured for machine learning or more specifically a neural network. This document does not, however, deal with the pre-processing or the locating of code zones in more detail.

A camera and a method for processing image data are described in EP 3 916 633 A1 in which method a segmentation takes place by means of a neural network in a streaming process, i.e. image data are already processed while further image data are still being read. At least the first layers of the neural network can be implemented on an FPGA. This considerably reduces the processing times and the demands on the hardware, but the segmentation or the code reading itself is not improved thereby.

EP 4 231 195 A1 shows a combined segmentation using classical image processing and machine learning.

Against this background, it is the object of the invention to further improve code reading, particularly in dynamic scenarios.

This object is satisfied by a method of reading optical codes and by a corresponding optoelectronic code reader in accordance with the respective independent claim. The method is a computer implemented method that runs, for example, on a processing unit of a code reader and/or a connected processing unit. An image is recorded in which an object having at least one optical code applied thereto is located. The image recording can in particular take place in any desired one of the initially described manners; for example, during a conveying movement or in that an object is presented to a camera in its field of view. Code zones are located in the image, that is image sections (regions of interest, ROIs) having an optical code, which is also called segmentation, as a preparatory step for the actual code reading. The located code zones are subsequently supplied to a decoder that reads the code content of the code in the respective code zone or that decodes the code and thus converts the then encoded massage into clear text. It must be noted that is can only be subsequently determined whether an object having an optical code actually was recorded by the image or whether an optical code can be read in a respective code zone.

A first segmentation process that uses machine learning is carried out as part of the locating of code zones. The first candidates for code zones determined here can already be used as code zones depending on the embodiment still to be described, can prepare the actual location of code zones, can be a subset of the code zones further processed in the decoder, or can be a criterion for what is recognized as a code zone. Machine learning here includes processes in a wider sense that are based on learning or training from data and in a narrower sense that are processes of artificial intelligence, in particular using a neural network. Classical image processing is used as an antonym in the following. Important practical differences are that the classical image processing has already been prepared by the programming for its task and does not first require experience or training and that its performance is more or less constant from the start up to and over the total running time. In machine learning, in contrast, all this by no means depends only on a programmed structure, but rather only results in conjunction with the training and the quality of the training data.

The invention starts from the basic idea of using results of the first segmentation process based on machine learning to adapt the locating of code zones and/or the decoding to the present situation. The adaptation is expressed via parameters here, which includes settings, configurations, and/or the selection of the processes or method steps or additional algorithms used. (Control) parameters for the segmentation and/or the decoder are thus derived and reset by evaluating the first candidates resulting from the first segmentation process.

The invention has the advantage that one respective situation adapted parameterization or setting of the segmentation or of the decoder is made possible. This increases the reading rate directly by more read codes and again indirectly by shorter processing times so that more decoding time becomes available for codes that are more difficult to read under (quasi) real time demands. No additional hardware effort, for instance in the form of a distance sensor, is required for this. The dealing with variable object heights, changing contrasts, and the like is thus improved. Objects having certain properties such as packet patterns often repeat lot-wise, particularly in logistics, so that a change promises great improvements for a whole series of approaching objects at a time that were conventionally treated like the preceding lot. The invention also facilitates the handling since at least some of the parameters no longer have to be set manually and are thus possibly not first made visible at all in a configuration tool so that its complexity is reduced.

The first segmentation process preferably generates a first result map, with a result map being an image of lower resolution than the recorded image whose pixels comprise information on whether a code zone has been recognized at the location of the pixel. This is a representation of the first candidates that is particularly simple to handle as a respective result map (heatmap). Due to the lower resolution in comparison with the image, each pixel of the result map stands for a certain region or tile of the image and provides information in a binary manner or using a scoring value as to whether it is part of a code zone or not or how likely a code (portion) had been recorded in this tile, possibly also with classification information such as which code type it presumably is.

Subsequently to the locating of the code zones, a fine segmentation preferably takes place in which the code zones are delineated more finely, in particular in the resolution of the image. Information on the position of a code zone does not yet necessarily contain the exact borders of the code. The code zone is, for example, only localized in its coarse resolution in the case of result maps. The fine segmentation improves the borders of the code zones, preferably with pixel accuracy in the resolution of the recorded image.

The first segmentation process preferably has a neural network, in particular a deep neural network or a convolutional neural network (CNN). This is a particularly proven process of machine learning for image processing. The first segmentation process can thus particularly reliably determine first candidates for code zones.

The neural network is preferably trained by means of monitored learning based on example images that are in particular evaluated using the results of a segmentation and/or decoding process without processes of machine learning. The supervised learning makes it possible to generalize to images presented later in operation from a training data set with examples of a specified correct evaluation. Corresponding architectures of neural networks and algorithms for training and operation (inference) are known per se so that well functioning solutions can be made use of or can be placed thereon. Some citations were named in the introduction. The assignment of the correct evaluation to an example image, that is the annotation or labeling, can in principle take place by hand since the training takes place before the run time. The first segmentation process can furthermore be trained at least in part with example images that a segmentation process has evaluated using classical image processing. This finally by no means only reproduces the classical segmentation process with other means since the neural network finds its own evaluation and generalization by the training. At least one classical decoder can furthermore be used that evaluates example images and that only annotates code zones retrospectively as a positive example when a code could actually be read there.

The locating of code zones preferably has a second segmentation process of classical image processing without machine learning by which second candidates for code zones are found, In other words, an additional classical segmentation takes place. A second result map therefore results analog to the first result map, that is an image of lower resolution than the original recorded image whose pixels comprise information on whether a code zone has been recognized at the location of the pixel. The second segmentation process preferably determines second candidates in an image divided into tiles. Only small image sections thereby have to be respectively processed in order, for example, to determine a contrast or to count brightness edges. The tiles can be worked through iteratively after one another, but also in parallel in any desired gradation. The second result map preferably includes one pixel per tile. If first and second result maps are processed together with one another, they advantageously have the same resolution or a resolution adaptation can take place.

A contrast threshold for the second segmentation process is preferably determined from the evaluation of the first candidates. The second segmentation process, that works with classical image processing, in this case uses a contrast criterion to find second candidates. The underlying heuristics is that the light and dark zones of an optical code generate a higher contrast than mere background structures. The selection of the contrast threshold thus has a great influence on overlooked optical codes or conversely on background structures falsely considered as optical codes. The first candidates, that are exactly the image zones having optical codes from the viewpoint of the first segmentation process, enable a particularly distinct selection of the contrast threshold.

The contrast threshold is preferably determined locally, in particular per environment of a first candidate. A yet more exact adaptation can be achieved by a local contrast threshold. The first candidates provide indications not only for contrast values in the image, but also even more specifically for their direct environment. Low contrast optical codes in a part of the image can be recognized in this manner under certain circumstances without simultaneously falsely recognizing background structures in another part of the image as optical codes. Alternatively, a global contrast threshold may be used that is therefore set the same for the whole image.

A segmentation mode is preferably determined from the evaluation of the first candidates. A segmentation mode determines the criteria according to which image zones are considered as code zones, in particular what influence the first candidates and the second candidates have on the fixing of code zones. The following segmentation modes are particularly preferably possible here:

1) Use the first candidates as code zones. In this case, the result of the first segmentation process is taken over as the result of the segmentation overall; the second segmentation process is then preferably not carried out at all.
2) Use the second candidates as code zones. In this case, the first segmentation process serves only to enable the parameterization in accordance with the invention; the first candidates themselves are not used as code zones.
3) Use only those code zones that are both first candidates and second candidates. This is a particularly strict criterion in which both segmentation processes have to be united in the sense of a logical AND or an intersecting set. There are thereby particularly few false positive regions at the cost of optical codes possibly being overlooked. The relationship of these two errors can be set particularly favorably in that this third segmentation mode or the now following fourth segmentation mode is selected with respect to the situation.
4) Use code zones that are first candidates or second candidates. All potentially recognized code zones of both segmentation processes are considered here in the sense of a logical OR or a union set. Optical codes are thereby as good as no longer overlooked; but in turn a particularly large number of code zones have to be evaluated by the code reader so that its available processing time is only sufficient when only a few false positive candidates remain due a skilled selection of the segmentation mode despite the OR link.

A ratio of the number of first candidates to the number of second candidates is preferably used as the criterion for determining the segmentation mode. This ratio ultimately provides information on how united the two segmentation processes are. If, for example, there are a great deal more second candidates than first candidates, this can be an indication of a pattern of the base. The second candidates are then presumably false positives to a great extent that only reacted to the contrast of the pattern and not an optical code so that a segmentation mode can be selected that relies solely or more intensely to the first candidates.

A filter that initially still excludes located code zones before the decoding is preferably determined from the evaluation of the first candidates. This filter is consequently a false positive filter that subjects first candidates to yet a further test so that valuable decoding time thus does not have to be used for code zones that do not actually contain any code. Depending on the evaluation of the first candidates, the result may be that at least one false positive filter is used or not.

The filter preferably checks whether the code zone has a light background and/or quiet zones of an optical code. These are two examples of a false positive filter. Optical codes are as a rule located on a label, accordingly in a homogeneous, light environment; this is checked in the first-named case. Quiet zones that ought to have an optical code are sought after the second case.

A ratio of the number of first candidates to the number of second candidates is preferably used as the criterion for determining the filter. The criterion is analog to the criterion named by way of example above for the determining of the segmentation mode.

The optoelectronic code reader in accordance with the invention has a light reception element to generate image data from received light and thus to record an image. The light receiver can be that of a barcode scanner, for example a photodiode, and the intensity profiles of the scans are assembled line-wise to form the image. It is preferably an image sensor of a camera-based code reader. The image sensor can in turn be a line sensor for the detection of a code line or of an areal code image by assembling image lines or a matrix sensor, with recordings of a matrix sensor also being able to be stitched together to form a larger image. A network of a plurality of code readers or camera heads is likewise conceivable. A process in accordance with the invention for reading optical codes in accordance with one of the embodiments is then implemented in a control and evaluation unit that can itself be part of a barcode scanner or of a camera-based code reader or can be connected thereto as a control device.

Figure 2:
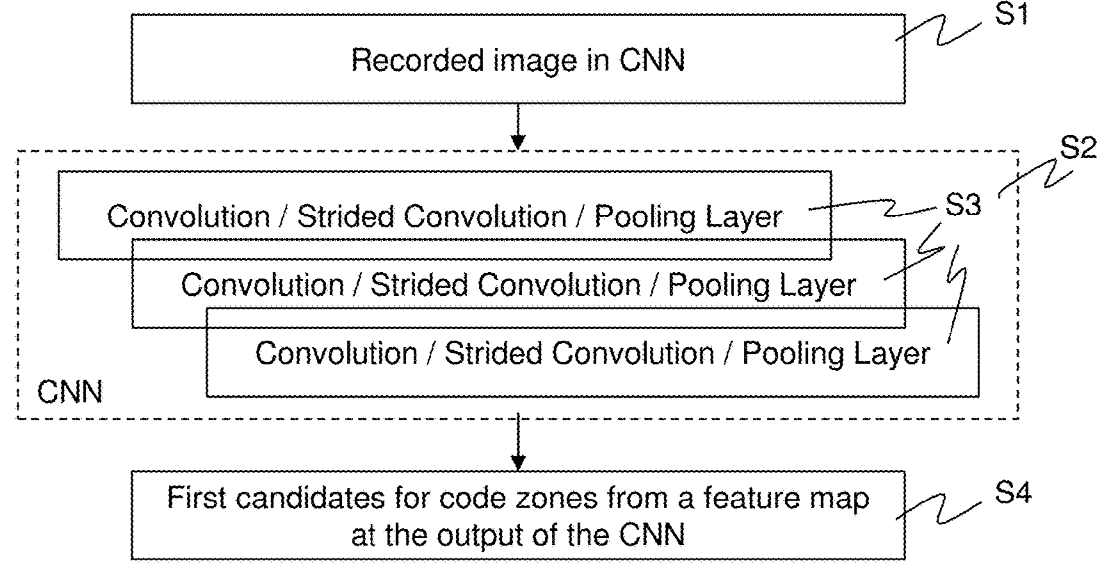
Figure 5:
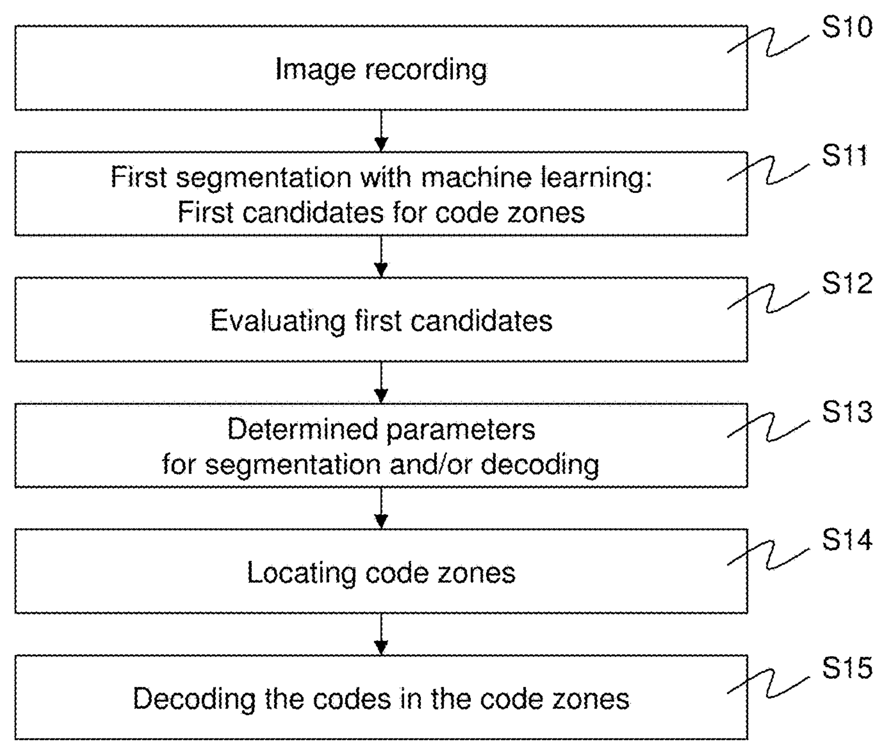
Figure 6:
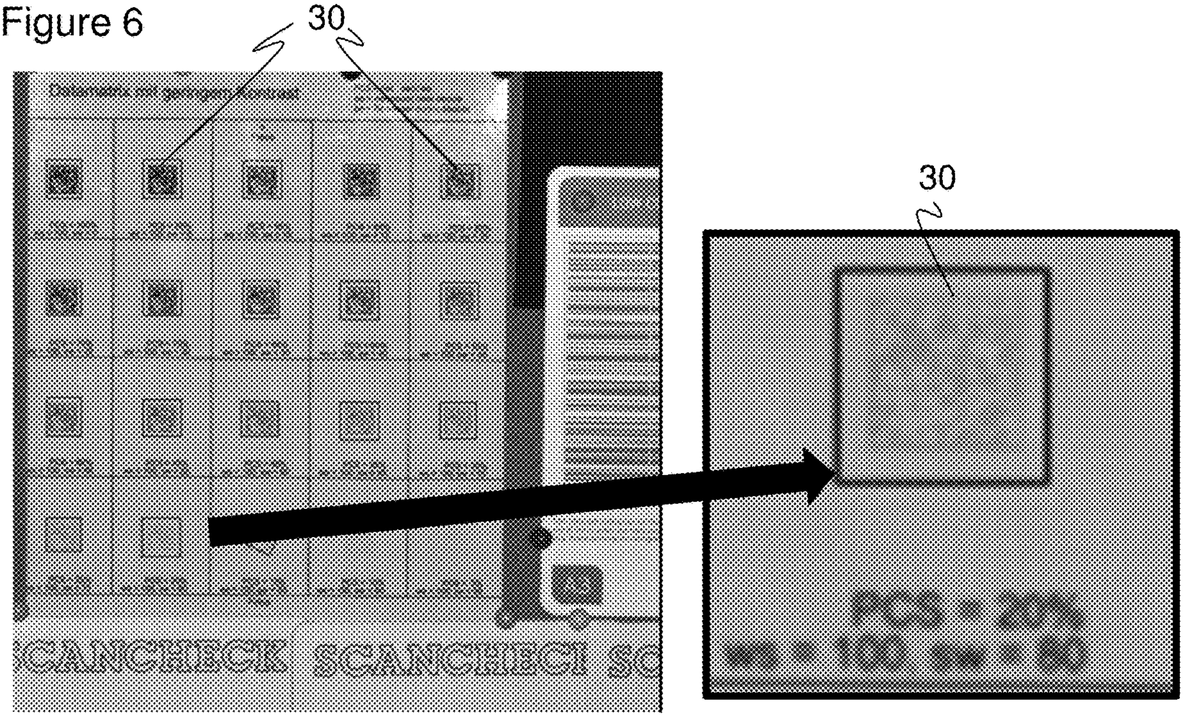
Figure 7:
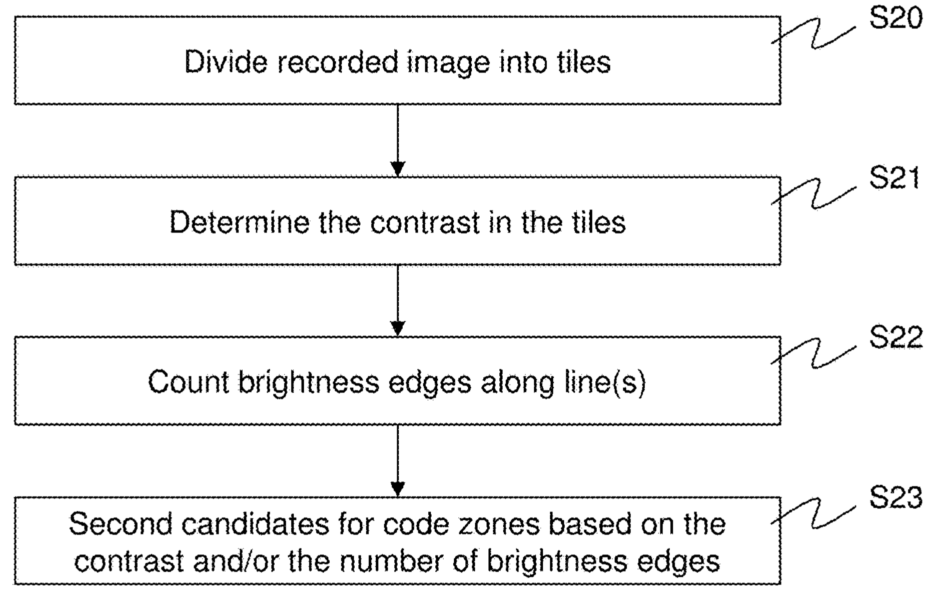
Figure 8:
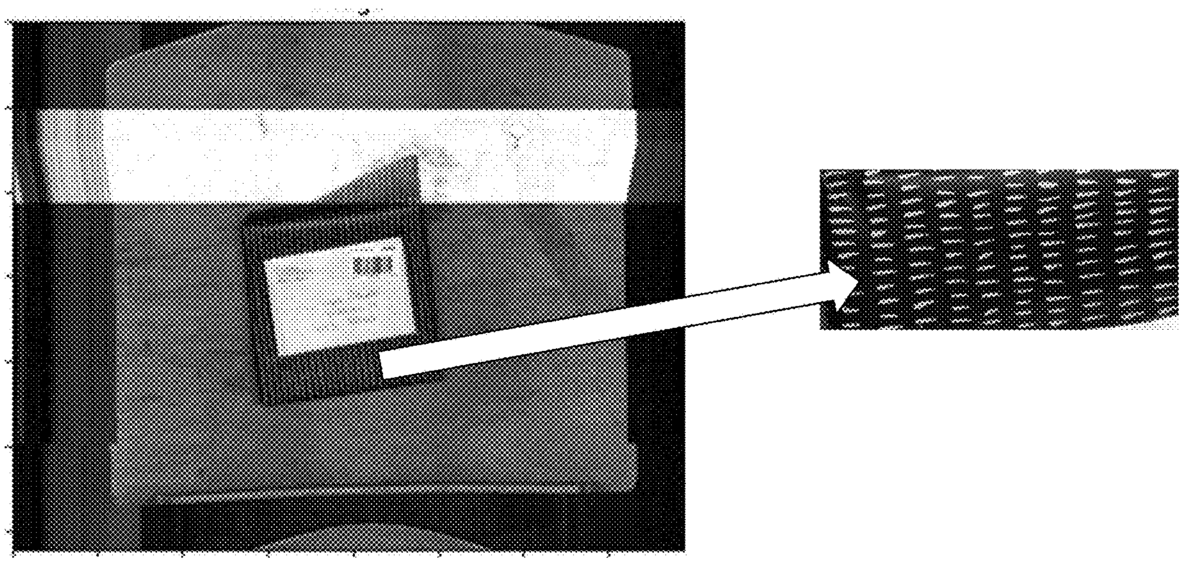
Figure 9:
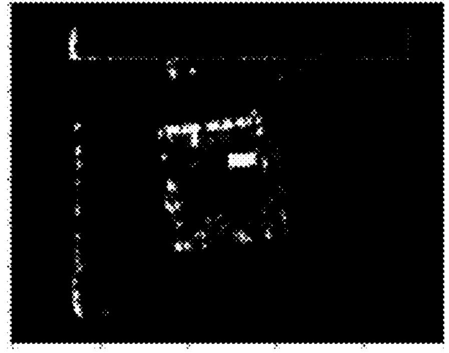
Figure 10A:
Figure 10B:
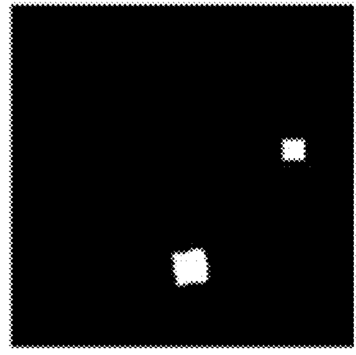
Figure 10C:
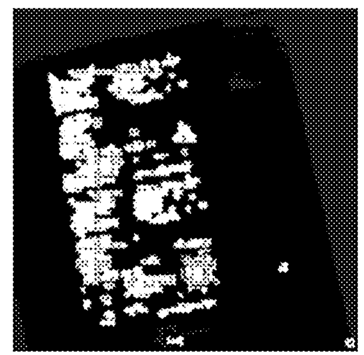

The invention will be explained in more detail in the following also with respect to further features and advantages by way of example with reference to embodiments and to the enclosed drawing. The Figures of the drawing show in:

FIG. 1 a schematic three-dimensional overview representation of the exemplary installation of a code reader above a conveyor belt on which objects having codes to be read are conveyed;

FIG. 2 an exemplary flowchart for a segmentation process with a neural network;

FIG. 3 an example image with optical codes that are printed with reducing quality;

FIG. 4*a* the result of a segmentation process applied to the image in accordance with FIG. 3 with a neural network for 2D codes;

FIG. 4*b* the result of a segmentation process applied to the image in accordance with FIG. 3 with a neural network for 1D codes;

FIG. 5 an exemplary flowchart for a parameterization of the segmentation and/or of the decoding based on an evaluation of the result of a segmentation process with a neural network;

FIG. 6 a repeat representation of the example image in accordance with FIG. 3 with a sectional enlargement of a low contrast code;

FIG. 7 an exemplary flowchart for a classical segmentation process;

FIG. 8 an example image of a code bearing object with a pattern-like texture and a sectional enlargement of the texture;

FIG. 9 the result of a segmentation process applied to the image in accordance with FIG. 8 with a neural network;

FIG. 10*a* a further exemplary image with optical codes and interference structures, here above all text;

FIG. 10*b* the result of a segmentation process applied to the image in accordance with FIG. 10*a* with a neural network; and FIG. 10*c* the result of a classical segmentation process applied to the image in accordance with FIG. 10*a*.

FIG. 1 shows an optoelectronic code reader 10 in a preferred situation of use mounted above a conveyor belt 12 that conveys objects 14, as indicated by the arrow 16, through the detection zone 18 of the code reader 10. The objects 14 bear codes 20 on their outer surfaces which are detected and evaluated by the code reader 10. These codes 20 can only be recognized by the code reader 10 when they are affixed to the upper side or at least in a manner visible from above. Differing from the representation in FIG. 1, a plurality of code readers 10 can be installed from different directions for the reading of a code 22 affixed, for instance, to the side or to the bottom in order to permit a so-called omnireading from all directions. The arrangement of the plurality of code readers 10 to form a reading system mostly takes place as a reading tunnel in practice. This stationary use of the code reader 10 at a conveyor belt is very common in practice. The invention, however, first relates to the code reader 10 itself and to the method implemented therein for the decoding of codes so that this example may not be understood as restrictive.

The code reader 10 detects image data of the conveyed objects 14 and of the codes 20 by an image sensor 24 and said image data are further processed by a control and evaluation unit 26 by means of image evaluation and decoding processes. It is not the specific imaging process that is important for the invention so that the code reader 10 can be set up in accordance with any principle known per se. For example, only one row is detected in each case, whether by means of a linear image sensor or in a scanning process, with a simple light receiver such as photodiode being sufficient in the latter case. The control and evaluation unit 26 stitches together the lines detected in the course of the conveyor movement to form the image data. A larger zone can already be detected in a recording using a matrix-like image sensor, with the assembly of recordings here also being possible both in the conveying direction and transversely thereto. The plurality of recordings are recorded consecutively and/or by a plurality of code readers 10 whose detection zones 18, for example, only cover the total width of the conveyor belt 12 together, with each code reader 10 only recording a part section of the total image and the part sections being assembled by image processing (stitching). An only fragmentary decoding within individual part sections with a subsequent stitching of the code fragments is also conceivable.

It is the object of the code reader 10 to recognize the codes 20 and to read the codes affixed there. The recognition of the codes 20 or of the code zones corresponding thereto in a recorded image is also called segmentation or presegmentation. The code reader 10 outputs information such as read codes or image data via an interface 28. It is also conceivable that the control and evaluation unit 26 is not arranged in the actual code reader 10, that is the camera shown in FIG. 1, but is rather connected as a separate control device to one or more code readers 10. The interface 28 then also serves as a connection between an internal and external control and evaluation. The control and evaluation functionality can be distributed practically as desired over internal and external modules, with the external modules also being able to be connected via a network or cloud. No further distinction is made of this all here and the control and evaluation unit 26 is understood as part of the code reader 10 independently of the specific implementation. The control and evaluation unit 26 can comprise a plurality of modules such as an FPGA (field programmable gate array), a microprocessor (CPU), and the like. Specialized hardware modules, for instance an AI processor, an NPU (neural processing unit), a GPU (graphics processing unit), or the like can in particular be used for the segmentation still to be described using a neural network. The processing of the image data, in particular the segmentation, can take place on the fly still during the reading of the image data or during the streaming, in particular on an FPGA, and in the manner such as is described for a neural network of a code reader in EP 3 916 633 A1 named in the introduction.

FIG. 2 shows an exemplary flowchart for a segmentation process with a neural network. A neural network, in particular a deep neural network or a convolutional neural network (CNN) is particularly suitable for this. In a step S1, the recorded image of the input layer of the neural network is supplied.

In a step S2, the neural network generates first candidates for code zones in a plurality of layers S3 from the inputs (inference). Three layers S3 are shown purely by way of example; the architecture of the neural network should not be restricted; and the usual tools are possible such as feedforward and feedback or recurrent, the omission of layers (ResNets), and the like. The convolutional layers that effectively convolute the image or, in deeper layers, the feature map of the preceding layer with a local filter are characteristic for a convolutional neural network. Resolution losses (downsampling) are possible here by larger displacement steps of the filter (strided convolution, pooling layer). The reduction of resolution is desired, in particular in early layers, to be able to perform the inference fast enough at all and with limited resources. Contrary to the representation, the neural network can also comprise layers without convolution or pooling.

The neural network is trained in advance using example images with known code zones (supervised learning). Such example images can be evaluated by hand (labeling, annotating). On the other hand, it is possible to evaluate example images using a classical decoder together with classical segmentation and to retrospectively recognize code zones based on actually readable codes. Such classical means are very powerful, particularly without time pressure in the offline mode so that a plurality of training examples can be automatically generated.

In a step S4, the neural network has concluded its inference and the feature map delivers the sought first candidates for code zones to its output. The first candidates are preferably determined in the form of a result map (heatmap). It is an image of a resolution that corresponds to, for example, the last feature map at the output of the neural network and whose pixels thus represent a certain region of the image of higher resolution. In the case of a binary result map, a pixel indicates whether a code zone is in the represented image section of the image or not. Alternatively, numerical values of the pixels can indicate an evaluation of the likelihood for a code (scoring value) and/or a specific code type.

FIG. 3 shows an example image with optical codes that are printed with reducing quality. FIGS. 4*a*-*b* show the result of a segmentation process used on the image in accordance with FIG. 3 with a neural network, namely a heatmap with first candidates for code zones 30 with 2D codes in FIG. 4*a* and with 1D codes in FIG. 4*b*.

FIG. 5 shows an exemplary flowchart for a parameterization of the segmentation and/or of the decoding based on an evaluation of the first candidates The idea here is to use information acquired from the first candidates to parameterize further steps of the code reader in a situation related manner. This may be a further segmentation using classical means, for example, as will be described further below. There is conventionally an egg or chicken problem here since properties from the code zones are required to locate code zones.

This is resolved in that the first segmentation process based on a neural network is free of parameters and actually does not require any advance information on the code zones of the current situation. In addition, the first segmentation process can be very early on in the processing chain, that is, for example, already as part of a pre-processing of the just recorded image on an FPGA. Parameterization is alternatively or additionally possible for the subsequent decoding.

To the extent still in overlap with the flowchart of FIG. 2, in a step S10 the image recording takes place and, in a step S11, the first segmentation process is applied to the recorded image with a neural network to acquire the first candidates.

In a step S12, the first candidates are evaluated to determine characteristics. They are used in a step S13 to determine parameters for the situation related adaptation of the subsequent steps, namely the location of code zones in a step S14 and/or the decoding of the code zones in a step S15.

There are here a plurality of control parameters for the location of code zones S14 and the decoding S15 that could be set or adapted. A search contrast for a classical segmentation, an activation of false positive filters, and a selection of a segmentation mode will be explained by way of example in the following. The invention equally relates to the adaptation of further control parameters, for instance the recognition of blur situations in which the recorded image is set back overall until processing time of the decoder possibly becomes available in a break in the future or of special situations in which an image does not need to be processed overall, or can probably not be meaningfully processed.

The first parameter considered more exactly is the search contrast for a classical segmentation. After the first segmentation process with a neural network, this is a second segmentation process that delivers second candidates for code zones. It will be discussed further below in connection with the third observed parameter how the first candidates and the second candidates can be used in different embodiments to fix the code zones.

The search contrast designates a required minimum gray scale change over a certain number of pixels, that is a contrast threshold, whereby textureless image regions or image regions that only vary weakly can be distinguished from the light/dark structures of an optical code 20. A fixed search contrast is conventionally specified or is parameterized once for a manual application. A situation related search contrast can be determined by an evaluation of the contrast of the first candidates. For example, the variation or standard deviation of the gray scales is determined in the image zone of the first candidates and a certain multiple thereof is fixed as the search contrast. The adapted search contrast can be set globally, that is over all the candidates, but also locally for a respective environment of a first candidate.

FIG. 6 shows a repeat representation of the example image in accordance with FIG. 3. The contrast reduces continuously here for illustration; a sectional enlargement shows a particularly low contrast code. Corresponding to FIG. 4*a*, the code zones 30 are known after the first segmentation process so that the contrasts per code zone can be determined. However, FIG. 6 can also be understood as an illustration for a slower change where initially high contrast codes could be read such as in the upper part and later low contrast codes occur as in the lower part. The search contrast based on the first candidates is respectively used later to avoid a reading rate collapse with a conventionally fixed search contrast.

FIG. 7 supplementarily shows an exemplary flowchart for a classical segmentation process. The classical segmentation is generally based on comparatively simple processing rules that can also be carried out by an FPGA. The classical segmentation shown here is to be understood as purely exemplary, in particular with respect to the admittedly advantageous, but not necessary use of tiles and any image processing processes can be used that are known per se for the segmentation, with there being the restriction for the classical segmentation process that no process of machine learning and thus in particular no neural network is used.

In a step S20, the image is divided into tiles, i.e. into image sections of, for example, 10×10 or a different number of pixels, that can also differ in the X and Y directions. The further processing can then take place tile-wise, with a parallelization over a plurality of tiles being possible.

In a step S21, the contrast per tile is determined since a homogeneous zone having little contrast does not contain any code. The gray values of the read pixels and their squares can already be summed on the fly, on an FPGA for example, for the contrast determination since the determination of the mean value and the standard deviation is then possible from these sum values without a repeat pixel access, with the latter being a contrast measurement. Such sum values can in another respect also be used in the above-described evaluation of the contrast of the first candidates to accelerate the calculations.

In a step S22, transitions from light to dark, or vice versa, are counted along a line, preferably on a test cross of two lines perpendicular to one another. They are potential edges between code elements of which a minimum number is expected in a code zone. Step S22 is an example of an optional further evaluation as part of the classical segmentation beyond the mere contrast evaluation.

In a step S23, a contrast evaluation takes place against the adapted search contrast. Tiles having too low a contrast are discarded; they are not first candidates for code zones. In tiles with sufficient contrast, optionally additionally the number of brightness edges are compared against an edge threshold are compared and tiles having too low a number are likewise discarded. The evaluation of the first candidates improves the second, classical segmentation process in this manner by setting a situation adapted search contrast.

The second parameter observed more exactly relates to the situation related switching in of at least one false positive filter. FIG. 8 shows an example image of a code bearing object with a pattern-like texture and a sectional enlargement of the texture. Such textures or patterns can satisfy a contrast criterion, also with an adapted search contrast, and a plurality of code zones are thereby sometimes recognized that actually only contain the pattern and are thus false positives. They can be at least partially eliminated by false positive filters, for instance the check for a light background corresponding to a code label or for the presence of quite zones of an optical code 20. However, false positive filters, on the one hand, cost valuable evaluation time and, on the other hand, they are partially too generous and discard optical codes instead of false positives; for instance, when an optical code is printed directly on a label edge and therefore does not include any quiet zones.

With a pattern-like texture as in FIG. 8, the second, classical segmentation process will generate a plurality of second candidates. In contrast to this, the first segmentation process with a neural network is very immune to such a texture. FIG. 9 shows a heatmap with first candidates for the image of FIG. 8. The first segmentation process has not detected the code zones having actual optical codes very distinctly, but anyway has by no means considered every region having a pattern structure as a code. There are therefore much fewer first candidates than second candidates. A simple criterion to recognize an image having an interfering pattern-like texture therefore evaluates the ratio of first candidates and second candidates and, if this is, for example, below ½ or another specified boundary value, a situation having a pattern-like texture is assumed and false positive filters are switched in.

The third more exactly observed parameter relates to the selection of a segmentation mode. In this respect, the following segmentation modes or a partial selection thereof can be available:

1) The first segmentation process, i.e. the first candidates are directly considered as code zones.
2) The second segmentation process, i.e. the second candidates, are directly considered as code zones; the first candidates only contribute indirectly in that parameters are in particular set for the second segmentation process based on the first candidates.
3) First combination mode: Code zones are only where first candidates AND second candidates have been recognized. Only the most promising code zones are supplied to the decoder by a restriction to the intersecting set. The balance here is on the avoidance of false positives at the cost of possible false negatives, that is overlooked optical codes.
4) Second combination mode: Code zones are where first candidates OR second candidates have been recognized. The union set supplies all the candidates to the decoder. The balance here is on the avoidance of false negatives at the cost that processing time is used on code zones in which there is no optical code at all.

The segmentation modes thus differ in the likelihood that a code zone actually contains a code and in the required processing time for the decoder. As already discussed, false positives are cumulatively caused by background textures in practice. A similar criterion can therefore be used as in the case of false positive filters that compares the number of first candidates and the number of second candidates. The more second candidates there are with respect to the first candidates, the more false positives can be assumed. If therefore there is a comparatively large number of second candidates, segmentation mode 1) is rather used because the classical segmentation is not reliable or segmentation mode 3) that only considers particularly promising code zones. Conversely, with a ratio close to one rather all the candidates in segmentation mode 4) are of interest that promises the highest reading rate, but that also requires the most processing time and would be overloaded with a lot of false positives; or in this case one relies on the classical segmentation already used for a long time in segmentation mode 2) because it is assured that no excessive number of false positives were thus found.

FIGS. 10*a*-*c* again illustrate the ratio of first candidates to second candidates. FIG. 10*a* here shows a further exemplary image with optical codes and interference structures, here above all text. A packet having a white label in the foreground that has numerous legends including a plurality of optical codes can be recognized in the background. FIG. 10*b* shows the result of the first segmentation process applied to the image in accordance with FIG. 10*a* with a neural network, that is the first candidates, and FIG. 10*c* shows the result of the second, classical segmentation process, that is the second candidates. The disparity is obvious and it is thus clearly recognizable that there were interference structures. The first segmentation mode could be selected here, for example, particularly since the first segmentation process has even recognized a code zone that the second segmentation process has overlooked due to the darker image zones and the damped contrast caused thereby.

If the first segmentation process should exceptionally not deliver any first candidates at all, the second segmentation process with its fixed search contrast can stand in by default. Alternatively, such an image can also be at least initially precluded from the decoding because there is a high likelihood that no optical code had been recorded at all or an optical code that is really present was anyway not able to be read due to a small size, blur, or the like.

The invention claimed is:

1. A method of reading optical codes, said method comprising the steps recording an image;

locating code zones in the image; and decoding the optical codes in the code zones, wherein the locating of code zones has a first segmentation process with machine learning by which first candidates for code zones are found, wherein the first candidates are evaluated to determine parameters for the locating of code zones and/or the decoding of the optical codes, wherein the locating of code zones comprises a second segmentation process of classical image processing without machine learning by which second candidates for code zones are found.

2. The method in accordance with claim 1, wherein the first segmentation process generates a first result map, with a result map being an image of lower resolution than the recorded image whose pixels comprise information on whether a code zone has been recognized at the location of the pixel.

3. The method in accordance with claim 1, wherein the first segmentation process has a neural network.

4. The method in accordance with claim 3, wherein the neural network is a convolution neural network.

5. The method in accordance with claim 1, wherein a contrast threshold for the second segmentation process is determined from the evaluation of the first candidates.

6. The method in accordance with claim 5, wherein the contrast threshold is locally determined.

7. The method in accordance with claim 6, wherein the contrast threshold is locally determined per environment of a first candidate.

8. The method in accordance with claim 1, wherein a segmentation mode is determined from the evaluation of the first candidates.

9. The method in accordance with claim 1, wherein one of the following segmentation modes is determined: use the first candidates as code zones; use the second candidates as code zones; only use those code zones that are both first candidates and second candidates; use code zones that are first candidates or second candidates.

10. The method in accordance with claim 8, wherein a ratio of the number of first candidates to the number of second candidates is used as the criterion for determining the segmentation mode.

11. The method in accordance with claim 1, wherein a filter that initially excludes located code zones before the decoding is determined from the evaluation of the first candidates.

12. The method in accordance with claim 11, wherein the filter checks whether the code zone has a light background and/or quiet zones of an optical code.

13. The method in accordance with claim 1, wherein the locating of code zones comprises a second segmentation process of classical image processing without machine learning by which second candidates for code zones are found and wherein a ratio of the number of first candidates to the number of second candidates is used as the criterion for determining the filter.

14. An optoelectronic code reader having at least one light reception element for generating image data and having a control and evaluation unit in which a method of reading optical codes is implemented, said method comprising the steps recording an image;

locating code zones in the image; and decoding the optical codes in the code zones, wherein the locating of code zones has a first segmentation process with machine learning by which first candidates for code zones are found, wherein the first candidates are evaluated to determine parameters for the locating of code zones and/or the decoding of the optical codes, wherein the locating of code zones comprises a second segmentation process of classical image processing without machine learning by which second candidates for code zones are found.

* * * * *